United States Patent
Premec

(10) Patent No.: US 8,695,082 B2
(45) Date of Patent: Apr. 8, 2014

(54) METHOD AND COMMUNICATION SYSTEM FOR ACCESSING A WIRELESS COMMUNICATION NETWORK

(75) Inventor: Domagoj Premec, Zagreb (HR)

(73) Assignee: Nokia Siemens Networks Oy, Espoo (FI)

( * ) Notice: Subject to any disclaimer, the term of this patent is extended or adjusted under 35 U.S.C. 154(b) by 836 days.

(21) Appl. No.: 12/259,274

(22) Filed: Oct. 27, 2008

(65) Prior Publication Data

US 2010/0107235 A1   Apr. 29, 2010

(51) Int. Cl.
*H04L 29/06*   (2006.01)

(52) U.S. Cl.
USPC ............................................ 726/12; 713/168

(58) Field of Classification Search
USPC ........................................... 726/12; 713/168
See application file for complete search history.

(56) References Cited

U.S. PATENT DOCUMENTS

| | | | |
|---|---|---|---|
| 7,778,260 B2 * | 8/2010 | Sturniolo et al. | 370/401 |
| 2003/0174679 A1 * | 9/2003 | Viola et al. | 370/338 |
| 2004/0185888 A1 * | 9/2004 | Serge | 455/517 |
| 2004/0268122 A1 | 12/2004 | Satarasinghe et al. | |
| 2005/0081036 A1 | 4/2005 | Hsu et al. | |
| 2006/0193272 A1 * | 8/2006 | Chou et al. | 370/310 |
| 2006/0236377 A1 * | 10/2006 | Metke et al. | 726/4 |
| 2007/0112967 A1 | 5/2007 | Lee et al. | |
| 2007/0160017 A1 | 7/2007 | Meier et al. | |
| 2008/0046366 A1 * | 2/2008 | Bemmel et al. | 705/44 |
| 2008/0072047 A1 | 3/2008 | Sarikaya et al. | |
| 2008/0101266 A1 * | 5/2008 | Dahlstedt et al. | 370/310 |
| 2008/0119160 A1 * | 5/2008 | Andriantsiferana et al. | 455/406 |
| 2008/0178266 A1 * | 7/2008 | Touray et al. | 726/4 |
| 2008/0298595 A1 | 12/2008 | Narayanan et al. | |
| 2008/0310323 A1 * | 12/2008 | Shirota et al. | 370/254 |
| 2009/0080387 A1 * | 3/2009 | Dell'Uomo et al. | 370/338 |
| 2009/0092099 A1 | 4/2009 | Gu et al. | |
| 2009/0207819 A1 * | 8/2009 | Kroselberg et al. | 370/338 |
| 2010/0106971 A1 | 4/2010 | Premec | |
| 2010/0183018 A1 * | 7/2010 | Nikander | 370/401 |
| 2011/0010538 A1 | 1/2011 | Falk et al. | |

FOREIGN PATENT DOCUMENTS

| | | | | |
|---|---|---|---|---|
| DE | 102006022369 A1 | 5/2006 | | |
| EP | 1796342 A1 | 6/2007 | | |
| WO | WO 2007068640 A1 * | 6/2007 | | H04L 12/56 |

OTHER PUBLICATIONS

"WiMAX Forum Network Architecture (Stage 2: Architecture Tenets, Reference Model and Reference Points)", Part 3—Informative Annex, Release 1.0.0, WiMAX Forum Proprietary, Mar. 28, 2007, 28 pages.

(Continued)

*Primary Examiner* — Michael Pyzocha

(57) ABSTRACT

A method for accessing a wireless communication network is described, comprising collocating a Proxy Agent apparatus with an Access apparatus and determining in a Mobile Gateway apparatus an address of the Access apparatus. The Proxy Agent apparatus comprises information about a Master apparatus, the Master apparatus being adapted for executing a master function. The method further comprises indicating a message, to be handled by the master function, as a master function message and sending the master function message to the address of the Access apparatus. Furthermore, the method comprises diverting in the Access apparatus the master function message to the Proxy Agent apparatus and forwarding the master function message to a Proxy Relay apparatus for relaying the master function message to the Master apparatus.

18 Claims, 4 Drawing Sheets

(56) References Cited

OTHER PUBLICATIONS

"WiMAX Forum Network Architecture (Stage 3: Detailed Protocols and Procedures)", WiMAX Forum Proprietary, Release 1.0.0, Mar. 28, 2007, 518 pages.

Aboba, B., et al., "RADIUS (Remote Authentication Dial In User Service) Support For Extensible Authentication Protocol (EAP)", Network Working Group, The Internet Society, Sep. 2003, pp. 1-41.

"Stage 2 Text: Multiple Hosts Support", Nortel, WiMAX Forum Network Working Group, Jan. 10, 2006, 17 pages.

Premec, Domagoj, et al., "Multiple Hosts behind MS", Siemens, WiMAX Forum Network Working Group, Dec. 19, 2005, 48 pages.

Rigney, C., et al., "Remote Authentication Dial In User Service (RADIUS)", Network Working Group, The Internet Society, Jun. 2000, 68 pages.

Zorn, G., et al., "RADIUS Attributes for Tunnel Protocol Support", Network Working Group, The Internet Society, Jun. 2000, pp. 1-18.

"Part 3: Carrier Sense Multiple Access With Collision Detection (CSMA/CD) Access Method and Physical Layer Specifications", IEEE Standard For Information Technology—Telecommunications and Information Exchange Between Systems—Local and Metropolitan Area Networks—Specific Requirements, IEEE Std 802.3-2002, Mar. 8, 2002, 46 pages.

Aboba, B., et al., "Extensible Authentication Protocol (EAP)", Network Working Group, Standards Tracks, Jun. 2004, 67 pages.

Aboba, B., et al, "Extensible Authentication Protocol (EAP) Key Management Framework", Network Working Group, Standards Track, Aug. 2008, 79 pages.

Chowdhury, K., et al., "Problem Statement for the AMSK", Network Working Group, Internet-Draft, Feb. 5, 2006, 11 pages.

IEEE, "Part 16: Air Interface for Fixed Broadband Wireless Access Systems", IEEE Standard for Local and Metropolitan area Networks, IEEE Computer Society and the IEEE Microwave Theory and Techniques Society, IEEE New York, NY IEEE Std., IEEE Std 802.16-2004, Oct. 1, 2004, 893 pages.

"Part 11: Wireless LAN Medium Access Control (MAC) and Physical Layer (PHY) Specifications", IEEE Standard for Information Technology—Telecommunications and information exchange between systems—Local and metropolitan area networks—Specific requirements, IEEE Computer Society, IEEE Std. 802.11-2007, Jun. 12, 2007, pp. 1-1232.

"Part 16: Air Interface for Fixed and Mobile Broadband Wireless Access Systems", Amendment 2: Physical and Medium Access Control Layers for Combined Fixed and Mobile Operation in Licensed Bands and Corrigendum 1, EEE Computer Society and the IEEE Microwave Theory and Techniques Society, IEEE Std. 802.16e 2005, Feb. 28, 2006, pp. 1-864.

Premac, Domagoj et al., "Multiple Hosts behind MS", WiMAX Forum Network Working Group, (Dec. 19, 2005),1-48.

Nortel, "Stage 2 Text: Multiple Hosts Support", WiMAX Forum Network Working Group, (Jan. 10, 2006),1-18.

"WiMAX Forum Network Architecture (Stage 2: Architecture Tenets, Reference Model, and Reference Points)", WiMAX Forum Proprietary, (Mar. 28, 2007),1-28.

"WiMAX Forum Network Architecture (Stage 3: Detailed Protocols and Procedures)", WiMAX Forum Proprietary, (Mar. 28, 2007),1-518.

Rigney, C et al., "Remote Authentication Dial In User Service (RADIUS)", Network Working Group—The Internet Society, (Jun. 2000),1-68.

Zorn, G et al., "RADIUS Attributes for Tunnel Protocol Support", Network Working Group—The Internet Society, (Jun. 2000),1-18.

Aboba, B et al., "RADIUS (Remote Authentication in User Service) Support for Extensible Authentication Protocol (EAP)", Network Working Group—The Internet Society, (Sep. 2003),1-41.

Non-Final Office Action for U.S. Appl. No. 12/259,269, mailed May 10, 2011, 14 pages.

Final Office Action received for the U.S. Appl. No. 12/259,269, mailed on Oct. 25, 2011, 13 pages.

Non-Final Office Action Response filed for U.S. Appl. No. 12/259,269, filed Aug. 10, 2011, 7 pages.

* cited by examiner

US 8,695,082 B2

METHOD AND COMMUNICATION SYSTEM FOR ACCESSING A WIRELESS COMMUNICATION NETWORK

TECHNICAL FIELD OF THE INVENTION

The present invention relates to the technical field of communication networks. In particular the present invention relates to a method for accessing a wireless communication network, a method for providing network access via a Mobile Gateway apparatus, a method for forwarding a Master function message in a Proxy Agent apparatus, a method for relaying a Master function message to a Master apparatus, a computer-readable medium, a communication system, a Mobile Gateway apparatus, a Proxy Agent apparatus, a Proxy Relay apparatus and a signal sequence.

BACKGROUND OF THE INVENTION

In a multiple host scenario for a WiMAX™ scenario a WiMAX™ station may exist, the so-called Gateway Mobile Station (G-MS), which may be equipped with additional network interfaces. These additional network interfaces may allow to connect hosts or G-hosts to a G-MS. Thus, the G-hosts may be end user devices which may be connected to the network via a G-MS. In other words, the G-MS may be a mobile access device or a mobile gateway device which may allow a plurality of different mobile stations, MS, or hosts to link to a network. The additional interfaces of the G-MS may base on an IEEE 802.11 standard or may base on an IEEE 802.3 standard. Thus, a G-MS at the same time may be an IEEE 802.11 access point and/or a IEEE 802.3 switch or an IEEE 802.3 bridge. Other interface technologies may also be possible.

Computers or hosts, which in the context of multiple host feature may be called the G-hosts, may attach to the WiMAX™ network through the G-MS for providing access to the WiMAX™ network, the G-MS may have a WiMAX™ connection to backhaul the traffic of the G-hosts to the G-MS.

If a G-host may use an IEEE 802.11 interface to connect to the G-MS, the G-MS may be acting as an IEEE 802.11 access point towards the G-host. Since the G-MS may only provide physical access to the network each G-host may have to have an individual WiMAX™ subscription, i.e. the G-host may need to be authorized to access the network of a Network Service Provider.

Since the G-MS may also be a mobile station the G-MS may also roam in an area of a WiMAX™ m network. While roaming, the access to the WiMAX™ network for the G-MS may change due to possible handoffs in the WiMAX™ access network.

In the document WiMAX™ Forum Network Architecture, "Stage 2: Architecture tenets, reference model and reference points", part 3—informative annex, release 1.0.0, Mar. 28, 2007, of the WiMAX™ Forum, different deployment scenarios are disclosed.

In the document WiMAX™ Forum network architecture, "Stage 3: Detailed protocols and procedures", release 1.0.0, Mar. 28, 2007, from the WiMAX™ Forum, stationary and mobile WiMAX™ clients are described.

The document NWG_Nortel_MultipleHosts_stage2, a contribution to the WiMAX™ Forum network working group, no. 060110, Jan. 10, 2006, describes a multiple host support.

Furthermore, from the document NWG Siemens Multiple Hosts_R1, no. 051219, December 2005, issues of multiple hosts behind a MS (Mobile Station) are known.

From the document, RFC 2865 (request for comment), "Remote Authentication Dial In User Service (RADIUS)", of June 2000, a RADIUS protocol is known.

There may be the need to provide a more efficient handover of a G-MS.

SUMMARY OF THE INVENTION

According to an exemplary embodiment of the present invention, a method for accessing a wireless communication network, a method for providing network access via a Mobile Gateway apparatus, a method for forwarding a Master function message in a Proxy Agent apparatus, a method for relaying a Master function message to a Master apparatus, a computer-readable medium, a communication system, a Mobile Gateway apparatus, a Proxy Agent apparatus, a Proxy Relay apparatus and a signal sequence may be provided.

According to an exemplary embodiment of the present invention, a method for accessing a wireless communication network may comprise collocating a Proxy Agent apparatus with an Access apparatus, wherein the Proxy Agent apparatus may comprise information about a Master apparatus. The Master apparatus may be adapted for executing a Master function.

In one example, the method may comprise determining in a Mobile Gateway apparatus an address of the Access apparatus and indicating or marking a message, which message may be intended to be handled by the Master function, as a Master function message.

In another example, the method may further comprise sending the Master function message to the address of the Access apparatus.

The method may further comprise diverting in the Access apparatus the Master function message to the Proxy Agent apparatus and forwarding the Master function message to a Proxy Relay apparatus for relaying the Master function message to the Master apparatus.

According to another exemplary embodiment of the present invention, a method for providing network access via a Mobile Gateway apparatus may be provided. This method, in an example, may comprise determining in the Mobile Gateway apparatus an address of an Access apparatus and indicating a message, to be handled by a Master function of a Master device, as a Master function message. In other words, a Master function message may be a message which may be indicated to be handled by a Master function of a Master device. In another example the method may further comprise sending the Master function message to the address of the Access apparatus.

According to another exemplary embodiment of the present invention, a method for forwarding a Master function message in a Proxy Agent apparatus may be provided, wherein the method may comprise collocating the Proxy Agent apparatus with an Access apparatus. In an example the Proxy Agent apparatus may comprise information about a Master apparatus, wherein the Master apparatus may be adapted for conducting a Master function. In another example the method may further comprise detecting a Master function message addressed to the Access apparatus and diverting the Master function message to the Proxy Agent apparatus. Furthermore, in an example, the method for forwarding a Master function message in a Proxy Agent apparatus may further comprise detecting a Master function message addressed to the Access apparatus and diverting the Master function message to the Proxy Agent apparatus and forwarding the Master function message to a Proxy Relay apparatus for relaying the Master function message to the Master apparatus.

According to yet another exemplary embodiment of the present invention, a method for relaying a Master function message to a Master apparatus may be provided. The method, in an example, may comprise collocating a Proxy Relay apparatus with an Authenticator apparatus, used for Mobile Gateway apparatus authentication. In an example, the method may comprise relaying a Master function message received from a Proxy Agent apparatus to the Master apparatus.

According to another exemplary embodiment of the present invention, a computer-readable medium may be provided, wherein the computer-readable medium may comprise program code, which program code, when being executed by a processor may carry out at least one method selected of the group of methods consisting of the method for accessing a wireless communication network, the method for providing network access via a Mobile Gateway apparatus, the method for forwarding a Master function message in a Proxy Agent apparatus and a method for relaying a Master function message to a Master apparatus.

Furthermore, a program element may be provided, which when being executed by a processor may carry out at least one method selected of the group of methods consisting of the method for accessing a wireless communication network, the method for providing network access via a Mobile Gateway apparatus, the method for forwarding a Master function message in a Proxy Agent apparatus and a method for relaying a Master function message to a Master apparatus.

According to yet another exemplary embodiment of the present invention, a communication system may be provided. The communication system may comprise a Proxy Agent apparatus, an Access apparatus, a Master apparatus, a Mobile Gateway apparatus, and a Proxy Relay apparatus.

The Proxy Agent apparatus, in an example, may be adapted to be collocated with the Access apparatus and the Proxy Agent apparatus may comprise information about the Master apparatus, wherein the Master apparatus may be adapted for executing a Master function.

A Mobile Gateway apparatus, for instance, may desire that the master function may be executed with a master function message or with the content of a master function message as an input. The Mobile Gateway apparatus may send the master function message by sending a message in a master function format.

In another example, the Mobile Gateway apparatus may be adapted to determine an address of the Access apparatus.

In yet another example, the Mobile Gateway apparatus may be adapted to indicate a message, to be handled by the Master function, as a Master function message, and to send the Master function message to the address of the Access apparatus.

In another example, the Access apparatus may be adapted to divert the Master function message to the Proxy Agent apparatus, wherein the Proxy Agent apparatus may be adapted to forward the Master function message to a Proxy Relay apparatus for relaying the Master function message to the Master apparatus.

In an example the Proxy Agent apparatus and the Proxy Relay apparatus may be a single apparatus, i.e. they are integrated in a common housing.

According to a further exemplary embodiment of the present invention, a Mobile Gateway apparatus may be provided, wherein the Mobile Gateway apparatus may comprise an address determining device and a message sending device.

In an example the address determining device may be adapted to determine an address of an Access apparatus and the message sending device may be adapted to indicate a message, to be handled by a Master function of a Master device, as Master function message.

Furthermore, in an example, the message sending device may be further adapted to send the Master function message to the address of the Access apparatus.

According to yet another exemplary embodiment of the present invention, a Proxy Agent apparatus may be provided, wherein the Proxy Agent apparatus may comprise a collocating device, a storage device, a message detection device, a diverting device and a forwarding device.

In an example, the collocating device may be adapted to collocate the Proxy Agent apparatus with an Access apparatus.

In an example, collocating may mean installing in the Access apparatus a deviation or a redirection for diverting a master function message addressed to the Access apparatus to the proxy Agent apparatus.

In another example the storage device may be adapted to store information about a Master apparatus, the Master apparatus being adapted for conducting a Master function. In an example storing information about a Master apparatus may comprise storing information about how the Master apparatus may be accessed or addressed.

In yet another example, the message detecting device may be adapted to detect a Master function message addressed to the Access apparatus and the diverting device may be adapted to divert the master function message addressed to the Access device to the Proxy Agent apparatus.

In another example, the forwarding device may be adapted to forward the Master function message to a Proxy Relay apparatus for relaying the Master function message to the Master apparatus, using the stored information about the Master apparatus.

According to a further exemplary embodiment of the present invention, a Proxy Relay apparatus, comprising a collocating device and a relaying device may be provided.

In an example the collocating device may be adapted to collocate a Proxy Relay apparatus with an authenticator apparatus for the Mobile Gateway apparatus.

In another example the relaying device may be adapted for relaying a Master function message received from a Proxy Agent apparatus to the Master apparatus.

According to another exemplary embodiment of the present invention, a signal sequence according to the R4 reference point or R4 interface may be provided, which signal sequence may allow to transmit a RADIUS message between a Proxy Agent apparatus and a Proxy Relay apparatus.

It may be seen as an idea of the present invention to send a Master function message to an address of the Access apparatus. The Access apparatus may be adapted to receive a message and to determine or to identify that the message, in particular the type of the message, the address of the message or a port of the message may need to be diverted to another device than to the Access apparatus itself.

However, the Access apparatus may also determine that the message may have an address of the Access apparatus as destination address. Since, the address may not fit with a service which the Access apparatus may offer, the Access apparatus may realize that the Access apparatus may have to send the received message to another apparatus. Thus, identifying the address and the message type, the Access apparatus may be able to determine that the message may have to be sent to another apparatus, for example to a Master apparatus.

Sending a message not to the address of the desired destination may allow addressing a function or a functionality in a network of which function the address may not be available at the source. In other words, the apparatus conducting, performing or fulfilling a corresponding function may not be directly addressed.

For example, a mobile device, a Mobile Gateway apparatus, or a MS may not know the address of an equipment fulfilling a function, which function may be desired by the Mobile Gateway apparatus. Thus, the Mobile Gateway apparatus may send the message to a network apparatus, a network device or a network equipment from which the Mobile Gateway apparatus may know the address.

In an example the Proxy Agent apparatus may be an AAA proxy agent. In another example the Access apparatus may be a FA, an AR, a DHCP proxy and/or a DHCP relay. In a further example the Master apparatus may be a AAA server. In yet another example the Mobile Gateway Apparatus may be a G-MS. In a further example, the Proxy Relay apparatus may be a AAA proxy function.

Thus, a G-MS, which may desire to authenticate a G-host connected to the G-MS may desire to use a RADIUS protocol, i.e. a RADIUS function, for the authorisation. A RADIUS message may be interpreted by an AAA server, which may be a Master apparatus. Thus, a destination address of the AAA server may have to be found. In particular the destination address of a corresponding AAA proxy may have to be found.

However, since the G-MS may be a mobile device, the G-MS may not know the address of the AAA-proxy. In other words, a G-MS may travel around, e.g. worldwide, and may attach to different access networks. Each access network may have its own AAA proxy with a different IP address. A G-MS may not be assumed to know, i.e. to have configured, IP addresses of all AAA proxies in all access networks to which it can possibly attach. Also, a G-MS generally may not know the address of either its own AAA server nor of the AAA server(s) that authenticate individual G-hosts.

But, the G-MS may know an address of an Access apparatus, e.g. a FA, an AR or a DHCP proxy/client. Therefore, if the AAA-proxy or a part of the AAA proxy, e.g. a AAA proxy agent or a Proxy Agent apparatus, may be adapted to be collocated at the Access apparatus associated with the G-MS, the correct path for a message may be able to be found. In other words, the AAA proxy agent may be adapted for following the Access apparatus when the access apparatus may change the location such, that the AAA proxy agent may be collocated with the Access apparatus. Thus, the G-MS may indirectly find a corresponding destination address of the AAA Proxy. Via the Proxy Agent apparatus, the G-MS may be able to find the RADIUS function in the network.

According to a further exemplary embodiment of the present invention, the method for accessing a wireless communication network may further comprise a Master function message, wherein the Master function message may be a Remote Authentication Dial In User Service (RADIUS) message.

A RADIUS message may be used to authenticate a user or a terminal or a mobile station in the network. Thus, a Mobile Gateway apparatus may desire to let a network conduct or fulfill authentication services or functions. An authentication function may comprise asking for user names and passwords and determining a subscription of a particular mobile device, a G-host or a G-MS.

A RADIUS message may have a certain type identifier and thus, a RADIUS message which may be sent as a Master function message to an Access apparatus address may be identified in the Access apparatus as a message belonging to a Master apparatus, which in this particular case may perform a RADIUS function.

According to a further exemplary embodiment of the present invention, collocating may comprise sharing an address.

Collocating may mean placing a device next to each other. Collocating may also mean installing an agent on another device or apparatus.

Another example of collocating may be to integrate a device or function to be collocated into another device. However, the integrated device or the attached device, or the integrated function or the attached function may only be activated when the integrated device or the attached device may be considered to be collocated. Thus, activating a collocated device may be associated with moving or handing over a Mobile Gateway apparatus to another Access apparatus. The collocated device may be a device within the Access apparatus. The collocated device may also be a function executed on at least a part of the Access apparatus.

Collocating may also mean linking to the Access device by sharing an address in order to receive a message in one or more devices at the same time. For example, sharing an address of a Proxy Agent apparatus with an Access apparatus may allow to reach the Proxy Agent under the address of the Access apparatus. The address of the Access apparatus may be a known address for a mobile device. For example, the mobile device may send all messages to the Access apparatus. Sharing this address with a Proxy Agent apparatus, may allow the Proxy Agent apparatus to simultaneously receive the messages addressed to the Access apparatus.

According to a yet another exemplary embodiment of the present invention, collocating may further comprise moving the Proxy Agent apparatus with the Access apparatus.

Since the Access apparatus may be an apparatus the address of which may be known to a mobile apparatus, a message from the mobile apparatus to a network or to an access network may always be sent to an Access apparatus. Moving a Proxy Agent such, that the Proxy Agent may always be collocated with the Access apparatus, in particular collocated with an active apparatus or an Access apparatus responsible for particular mobile device may allow to receive the messages from a mobile device.

In another exemplary embodiment of the present invention, the Master function may be an authentication and/or an authorization function.

An authentication function or an authorization function may allow to control the access to a network. In one example may only mobile devices or G-hosts or G-MS which may have a subscription may be allowed to access a network. Such an access control may be provided with an authentication or authorization function. Since authentication and authorization may be required at the beginning of a network session sending a message to a Master function with an address of an Access apparatus may help to reach the authentication or authorization function within the network, without having a network address from a Master apparatus conducting an authentication function.

According to another exemplary embodiment of the present invention, the Mobile Gateway apparatus may be a G-MS (Gateway MS).

A G-MS may be a mobile device which may allow accessing a network by G-hosts. The G-MS may have to register to the network, authenticate or authorize to the network only one time and then may allow a plurality of G-hosts to access the network via the G-MS. Such a G-MS may need to use a Master function. The number of terminals, hosts or G-hosts accessible to the G-MS may depend on the number of interfaces of the G-MS or on the number of virtual interfaces of the G-MS.

According to another exemplary embodiment of the present invention, the Access apparatus may be at least one apparatus selected of the group of Access apparatuses consisting of a DHCP proxy (Dynamic Host Configuration Protocol), a DHCP relay, a Foreign Agent (FA), an Access Router (AR) and an Access Serving Network Gateway (ASN-GW).

A DHCP proxy, a DHCP relay, a FA, and an ASN-GW may have an address which may be substantially always known to a G-MS. Thus, these Access apparatuses may allow sending a Master function with an address of these apparatuses since the address may be known in the G-MS. A Proxy Agent apparatus may be collocated to an Access apparatus, for example a DHCP proxy and may know that substantially every message, which the G-MS may send to the network, may be sent via the address of the Access apparatus.

According to another exemplary embodiment of the present invention, determining an address of the Mobile Gateway apparatus may comprise dynamically determining the address.

Dynamically determining the address may allow to detect amendments of the address of the Access apparatus. By roaming of a MS, in particular of a G-MS, it may happen that the MS may be handed over to another network device. Thus, an address of an Access apparatus corresponding to the G-MS may change. Since the G-MS may have a single address which the G-MS may use to access the network dynamically determining the address may help to keep track with actual addresses of an Access apparatus.

According to another exemplary embodiment of the present invention, the method may further comprise detecting in the Mobile Gateway device an amendment of the Access apparatus.

The amendment of the Access apparatus may also concern the address of the Access apparatus and therefore a Mobile Gateway or G-MS may react to amendments within the network.

According to another exemplary embodiment of the present invention, the Master function message may comprise encapsulating the Master function message for forwarding. An example for encapsulating a message may be a tunnel which may allow reaching a defined destination within a network.

For example, a Master apparatus may be a central apparatus in a network, encapsulating a message and sending the encapsulated message to the Master apparatus may allow reaching the Master apparatus independently from the source of the sender or the location of the sender of the message. Encapsulating a message may mean setting up a tunnel, which may have in an example a defined address as an endpoint.

According to another exemplary embodiment of the present invention, forwarding the Master function message may comprise using an address of an authenticator address.

The authenticator address may be the address of an authenticator of a G-MS. The address of a G-MS authenticator may also be known in the network.

According to another exemplary embodiment of the present invention, the method of relaying a Master function message to a Master apparatus may further comprise receiving a message from the Master apparatus for the Proxy Agent apparatus and sending the message for the Proxy Agent apparatus to an address of an Anchor Data Path Function (A-DPF).

An A-DPF may also be a function which may be collocated with an FA for example and therefore sending a message to the address of an A-DPF function may allow reaching an address in an opposite direction to the direction of sending a Master function message. Sending a Master function message may be along an uplink direction and sending a message to an A-DPF may be sending a message in a downlink direction. The uplink direction and the downlink direction may be opposite directions.

Thus, dynamic detection of an AAA proxy address by a G-MS in a multihost scenario in a WiMAX™ network may be provided.

It has also to be noted that exemplary embodiments of the present invention and aspects of the invention have been described with reference to different subject-matters. In particular, some embodiments have been described with reference to apparatus type claims whereas other embodiments have been described with reference to method type claims. However, a person skilled in the art will gather from the above and the following description that unless other notified in addition to any combination between features belonging to one type of subject-matter also any combination between features relating to different subject-matters in particular between features of the apparatus claims and the features of the method claims may be considered to be disclosed with this application.

These and other aspects of the present invention will become apparent from and elucidated with reference to the embodiments described hereinafter.

Exemplary embodiments of the present invention will be described in the following with reference to the following drawings.

DETAILED DESCRIPTION

Figure 1:
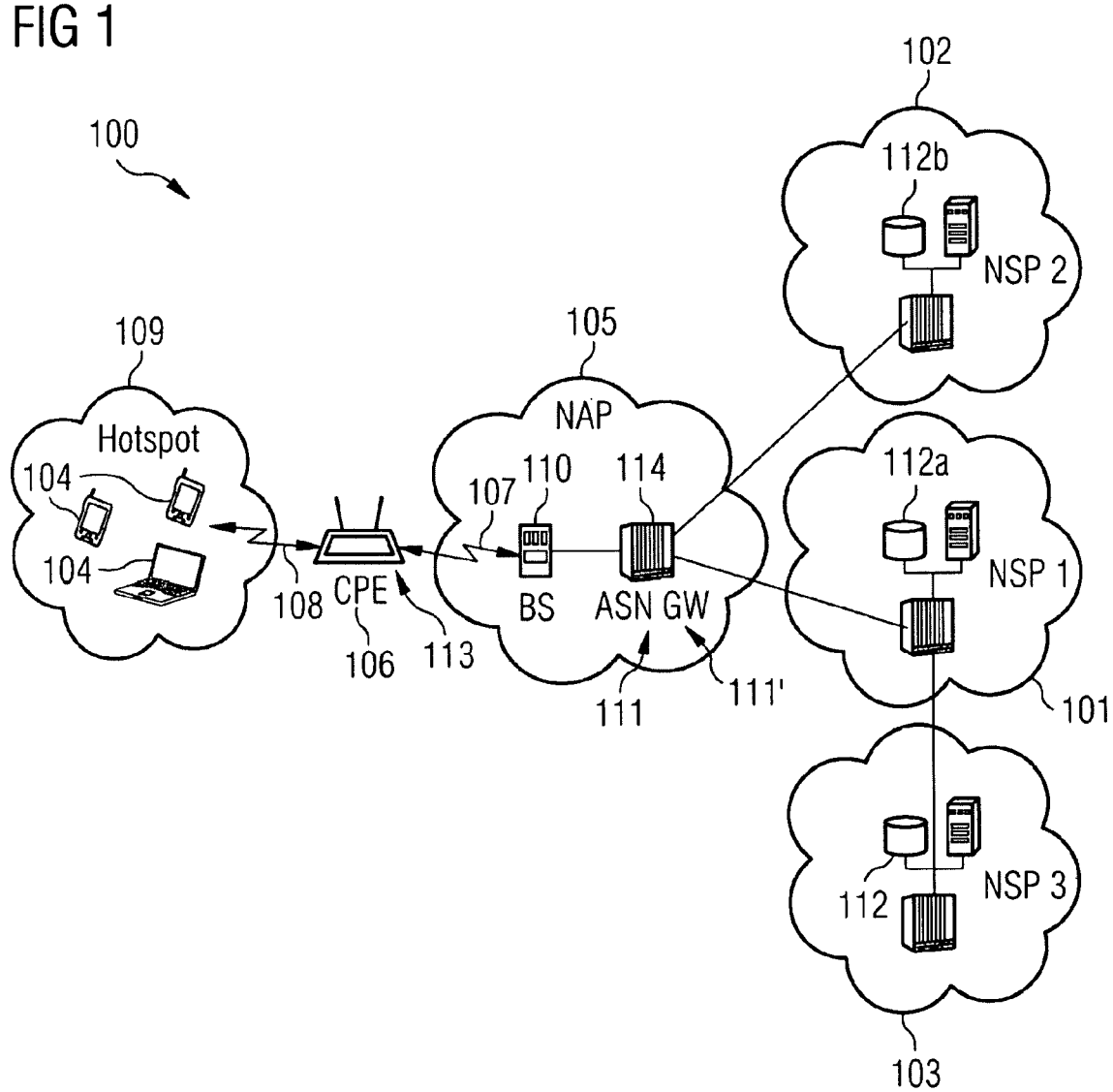
FIG. 1 shows a block diagram of a communication system using a G-MS as a Gateway providing access to a network according to an exemplary embodiment of the present invention.

The illustration in the drawings is schematic. In different drawings, similar or identical elements are provided with the same reference numerals.

FIG. 1 shows a network system 100 or communication system 100 which is separated in a plurality of sub-networks. The network service providers 101, 102, 103, NSP1, NSP2, NSP3 offer services in a communication network. The services offered by the NSPs 101, 102, 103 may be value added services like Internet access, Voice over the Internet protocol (VoIP), Games etc. The NSPs 101, 102, 103 may not operate a network and thus, the NSPs 101, 102, 103 may receive traffic from their customer 104, user 104 or subscriber 104 via an Network Access Provider NAP, 105.

Since the NSPs 101, 102, 103 may have a contract with the subscriber 104, the service provider may verify before allowing the subscriber 104 to access the services of the NSP 101, 102, 103 whether the subscriber may be authorized using the services.

The subscriber 104 may use computers 104, MSs 104 or hosts 104, e.g. G-hosts 104 to attach to a network 105 wirelessly, e.g. the WiMAX™ network. For wireless network access the G-hosts 104 may connect through the G-MS 106 or wireless CPE (Customer Premise Equipment) 106. The G-MS 106 may use its WiMAX™ connection 107 to backhaul the G-hosts' 104 traffic. A G-host 104 may be a host having the multiple host feature, i.e. a G-host 104 may be adapted to connect to a G-MS 106 or Gatway Mobile Station 106. A G-host 104 may attach to the G-MS using the IEEE 802.11 technology. In that case the G-MS 106 may act as an IEEE 802.11 access point towards the G-hosts. Since the G-MS may have two wireless links 108, 107 the G-MS 106 may offer services wirelessly in a moving object. For example, the G-MS 106 may supplies a Hotspot 109 in a moving means of transportation.

Each of the G-hosts 104 may have a WiMAX™ subscription. This subscription may allow a G-host to access a core network, in particular the network of a NSP 101, 102, 103. The Network Access Provider NAP, 105 may collect in the Access network 105 the traffic of the G-hosts 104 and backhauls the collected traffic to the corresponding destinations 101, 102, 103.

For permitting wireless access the Access network 105 comprises the Base Station (BS) 110, which connects with the G-MS 106 via wireless link 107. For distributing the collected traffic to the various NSP 101, 102, 103, the access network comprise the ASN GW 114.

A hotspot 109 may be the area which a G-MS 106 covers, i.e. in which area the G-MS 106 may be able to provide connectivity. Each of the G-hosts 104 in a hotspot may be attached to the WiMAX™ network 105 through G-MS 106. Each G-host 104 may have a WiMAX™ subscription and may be separately authenticated to the network with their WiMAX™ subscription. Some hosts 104 may belong to a NSP (Network Service Provider) 101, 102, 103, which may not have a direct relationship with the NAP (Network Access Provider).

The subscriber authentication in WiMAX™ may be based on EAP (Extensible Authentication Method). When a WiMAX™ MS (Mobile Station) may attach to the network 105, the MS 106 may act as an EAP supplicant. An ASN GW (Access Serving Network Gateway) 114 of the NAP may act as an EAP authenticator. The AAA server 112 may be located in the subscriber's home CSN (Connectivity Serving Network) 101, 102, 103.

For authorization between G-host 104 and NSP 101, 102, 103 the Radius protocol is used. Thus, each of the G-hosts may be authenticated with the corresponding NSP 101, 102, 103.

For authentication purposes the G-MS 106 may be handled as a standard MS. Therefore, the G-MS 106 may be authenticated as any other MS. I.e. when the G-MS may attach to the network, the G-MS 106 may act a EAP supplicant and an ASN GW 114 in the network may act as the EAP authenticator.

In other words, the G-MS 106 may be an MS which may be connected to a network like a standard MS. However, the G-MS 106 may provide a plurality of interfaces 108 in order to provide access for at least one other MS 104. The G-MS 106 may have a interface 108 selected from the group of interfaces consisting of a Bluetooth interface, a WiMAX™ interface, an IEEE 802.11x interface, an IEEE 802.16x interface, an IEEE 802.3x interface. Thus, the G-MS may provide wire-bound and/or wireless interfaces. If one of the plurality of interfaces 108 is a wireless interface, a wireless hotspot may be provided.

When a WiMAX™ subscriber 104 may attach as a G-host 104 through the G-MS 106 the same EAP method and credentials may be used for authorizing the G-MS 106. During the authentication of the G-host 104, the G-host 104 may act as an EAP supplicant.

However, instead of the ASN GW 114, the G-MS 106 may act as an EAP authenticator for the G-host 104. An EAP authenticator may not need to be aware of the access parameter, such as credentials or password, of the host which has to be authenticated.

G-MS 106 also comprises a RADIUS client 113. The H-AAA 112 server of the G-host 104 is located in G-host's home CSN 103. The ASN GW 114 in the ASN 105 acts as an AAA proxy 111 with which the RADIUS client 113 in the G-MS 106 communicates during the authentication of the G-host 104. The protocol between G-MS 106 and AAA proxy 111 in the ASN is RADIUS. There may exist additional intermediary AAA proxies 111' between the AAA proxy 111 in the ASN 105 and the home AAA server 112 in the home CSN 103.

The RADIUS client 113 in the G-MS 106 needs an IP address of the AAA proxy 111 in the ASN 105 for sending RADIUS messages during authentication of a G-host 104.

Thus, it may be seen as an idea of the invention, to allow the G-MS 106 to determine the IP-address of the ASN GW 114 in the ASN 105. The ASN GW 114 may comprise the AAA proxy 111. The contact or the connection to the AAA proxy 111 may allow the G-MS to use the RADIUS protocol by using a RADIUS function.

In order to deliver the RADIUS messages to the RADIUS Proxy 111, the G-MS 106 delivers the RADIUS messages to the address of a known network component such as the Foreign Agent (FA) or DHCP (Dynamic Host Configuration Protocol) Proxy/Relay.

Figure 2:
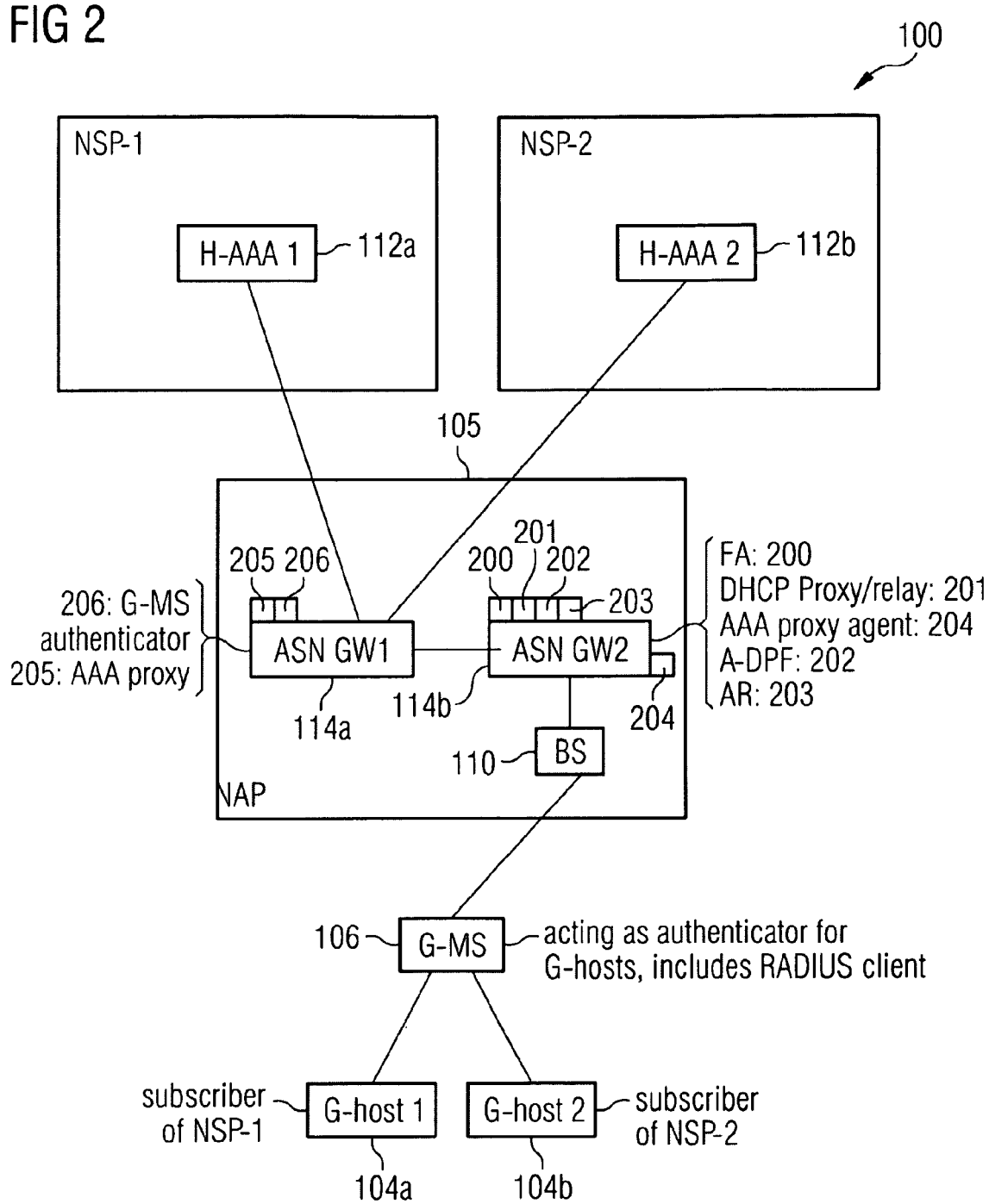
FIG. 2 shows a block diagram of different functional entities of a communication system according to a an exemplary embodiment of the present invention.

FIG. 2 shows a block diagram of the location of different functional entities after a G-MS has performed a CSN (Connectivity Serving Network) anchored handover.

In FIG. 2, the G-MS has been moved to the BS 110, i.e. G-MS 106 has been handed over to the BS 110. This handover caused moving of the FA 200 and/or the DHCP Proxy/Relay 201, the Anchor Data Path Function (A-DPF) 202 and the Access Router (AR) 203 from the ASN GW1 114*a* to the ASN GW 2 114*b*.

Furthermore, the AAA Proxy Agent 204 or the Proxy Agent apparatus 204 has been moved to ASN GW2 114*b* or has been collocated with ASN GW2 114*b*.

Addresses of the FA 200 and/or of the DHCP Proxy 201 and/or of the DHCP Relay 201 are known to the MS, e.g. the G-MS 106, or can be found out by sending a broadcast message. In particular, a MIP4 (Mobile IP Version 4) enabled MS, e.g. the G-MS 106, may know the address of the Foreign Agent 200, and non-MIP4 enabled MS may know the address of the DHCP proxy/relay 201.

The MS, e.g. the G-MS 106, learns the addresses of the Foreign Agent 200 and/or DHCP Proxy/Relay 201 in a dynamic manner during the initial attachment to the network 105.

The AAA proxy agent (Authentication, Authorization, Accounting) 204 is adapted to be collocated with the FA and DHCP proxy/relay, thus sharing the same IP address as those two functions. The AAA proxy agent 204 or the Proxy Agent apparatus 204, in particular a collocating device, may be adapted to determine whether any move of the G-MS 106 has happened. In the case that a move has happened, the AAA proxy agent may determine the destination of the move and transfer the AAA proxy agent to this destination. In other words, the AAA proxy agent 204 may always tries to be collocated with the FA 200 and/or DHCP Proxy/Relay 201 and therefore, may move with the FA 200 and/or DHCP Proxy/Relay 201.

Moving in this context may mean being activated since the AAA proxy agent 204 may be a function within an ANS GW 114b. Thus, moving may be any procedure allowing the AAA Proxy Agent 204 to be accessible at an address of a network element, which address may substantially always can be found out by the G-MS 106.

During the CSN anchored mobility management a FA function and DHCP proxy/relay function move to a different ASN GW 114b. The AAA proxy agent function 204 shall always move together with the FA 200 and/or DHCP proxy/relay 201 such that the AAA proxy agent function 204 always stays collocated with the FA 200 and/or DHCP proxy/relay 201.

The AAA Proxy agent function 204 may be a function or a functionality on a Proxy Agent apparatus 204 or on a AAA Proxy agent 204.

If the G-MS 106 detects that the address of the FA 200 and/or DHCP proxy/relay function 201 has changed, the G-MS 106 may send uplink RADIUS packets to the detected address.

The FA 200 and/or DHCP proxy/relay 201 may be comprised by an ASN GW 114a, 114b.

When the ASN GW 114b detects an uplink packet destined to the IP address of the ASN GW 114b, the ASN GW 114b delivers the uplink packet to the appropriate functional entity residing in that ASN GW 114b. Different functional entities may be differentiated by different port numbers, by different service names or by different service types.

If the packet is a RADIUS packet, the packet will be delivered to the AAA proxy agent 204 which is collocated to the ASN GW 114b.

The AAA proxy function 111 in the ASN 114 which relays RADIUS messages to/from AAA server 112, 112a, 112b in the CSN, shall always be collocated with the authenticator function of the G-MS in the same ASN GW. The G-MS 106 may move or travel in the network and/or may require re-authentication after movement. However, the authenticator function of the G-MS 106 does not need to move every time when the G-MS 106 moves. Generally, the authenticator function stays anchored in the ASN GW even when the G-MS 106 moves to another ASN GW.

However, in a particular example, moving of the authenticator function 206 from one ASN GW 114a, 114b to another may be desired. Such a movement can be conducted by means of a special procedure. This special procedure may be independent from the G-MS movement and may need to be invoked separately. Thus, the location of the G-MS authenticator 206 is substantially fix.

If the authenticator function 206 of the G-MS has moved then the AAA proxy function 205 for all G-hosts 104a, 104b attached to the G-MS shall also move together with G-MS's authenticator. In other words, the G-MS authenticator function 205 and the AAA proxy function 205 to which the G-MS 106 sends the RADIUS messages during G-host 104, 104a, 104b authentication are collocated or tied together. So if the G-MS authenticator function 206 moved, also the AAA proxy function 205 for the G-host moved together with—the MS authenticator function 206, in order to stay collocated with the G-MS authenticator function 206.

The movement of the AAA proxy function 111 may be prevented by separating the AAA proxy function 111 in a static AAA proxy function 205 or Proxy Relay apparatus 205 and a movable AAA agent function 204 or Proxy Agent apparatus 204.

Since a function may be a function executed on a corresponding apparatus, the terms function and apparatus may be used equivalent in this text.

The AAA proxy agent 204 will deliver the RADIUS packet sent by the MS, e.g. the G-MS 106, to the AAA proxy 205 in the ASN 114a. If the AAA proxy 205 and the AAA proxy agent 204 are not collocated in the same ASN GW 114a, 114b, the AAA proxy agent 204 shall encapsulate the RADIUS message into a defined WiMAX™ signalling message and send WiMAX™ signalling message via R4 interface to the AAA proxy 205.

The IP address to which this message is sent is the address of the G-MS's authenticator function 206. The authenticator function 206 may be for example an EAP authenticator. In another example the authenticator function 206 is a RADIUS authenticator. In yet another example the EAP messages received by an EAP authenticator at the ASN GW 114a are encapsulated into RADIUS messages for sending the EAP messages to the H-AAA 112a, 112b.

EAP messages may not be routable over the AAA infrastructure, thus the EAP messages may be encapsulated in RADIUS messages and then the RADIUS based AAA infrastructure can take care of delivering the message to the correct recipient. Thus, for example EAP messages from the G-MS are transported in RADIUS messages to the ASN GW 114.

Thus, the known and substantially fix G-MS authenticator 206, i.e. the entity that authenticates the G-MS 106 is collocated with the AAA proxy function 205. The AAA proxy agent 204 needs to send a message to the corresponding AAA proxy 205. Since the AAA proxy agent 204 knows the address of the G-MS's authenticator 206 and it also knows that by definition G-MS's authenticator 206 and AAA proxy functions 205 are collocated, the AAA proxy agent 204 relays the message to the address of the G-MS's authenticator 206.

This address of G-MS's authenticator function 206 may always available at the ASN GW 114b hosting the AAA proxy agent 204 function, or this address may be able to be explored by the AAA proxy agent 204. Therefore, it may not be necessary for the AAA proxy agent 204 to store the address of the AAA proxy 205 as the address of the G-MS's authenticator 206 is known to the ASN GW 114b due to other needs.

In a particular example, when the AAA proxy agent function 204 may move, the AAA proxy agent function 204 may store the address of the AAA proxy function 205. Storing the corresponding address may prevent to explore the address.

When the AAA proxy 205 receives a downlink RADIUS message from a home AAA server 112a, 112b related to a G-Host 104a, 104b, the AAA proxy 205 encapsulates it into a WiMAX™ signalling message and send it via R4 reference point to the address of the anchor data path (A-DPF) function 202.

IN other words, the A-DPF address is known to the ASN GW ASN GW1, 114a, and since the AAA proxy agent 204 is collocated with the A-DPF, the AAA proxy 205 in ASN GW ASN GW1 can simply send the message to the address of the A-DPF. Therefore, the ASN GW ASN GW1, 114a doesn't need to separately remember, store or save an address of the AAA proxy agent 204.

Even if the ASN GW 114a not have to store the address, the ASN GW could store the address. But, storing a separate copy of the AAA proxy agent address may require to update the stored address. Otherwise, it may be possible that the address is not updated when the A-DPF/FA/DHCP moves, e.g. in a case that a bug in an implementation exists or even if updating is not provided in the implemented standard. If the address may not be updated the address could become invalid.

Therefore, it can be seen as an aspect of the present invention that a desired functionality or apparatus actively may be collocated with a known functionality or apparatus, in order to find out the location or address of the desired functionality. The known functionality in this arrangement could be a functionality whose location or address may be known by the user of the known functionality or can be found out. The known functionality may be adapted such, that in a case that it receives a message which is directed to the desired functionality, the known functionality divert the message to the desired functionality, or to a functionality collocated with the known functionality, which collocated functionality knows how to handle the message.

The A-DPF function 202 is always collocated with the FA 200 and/or DHCP proxy/relay 201 and thus also with the AAA proxy agent 204.

When the AAA proxy agent 204 receives a downlink RADIUS message from AAA proxy 205, the AAA proxy agent 204 shall inject it into an appropriate R6/R4 data path available on the ASN GW 114b carrying the G-MS 106 traffic.

In other words, for reaching a function in a network associations between services and network addresses are used. Apparatuses which may be able to handle desired functions are located near by network equipment with known addresses. For example for the uplink, the G-MS 106 may send a RADIUS request, i.e. a RADIUS type message, to the address of the FA 200 and/or DHCP proxy/relay 201. The FA 200 and/or DHCP proxy/relay 201 may not know what to do with a RADIUS message. However, the FA 200 and/or DHCP proxy/relay 201 may have an association that RADIUS messages, addressed to a FA 200 and/or DHCPP proxy/relay, may be diverted to the AAA proxy agent 204. Thus, the AAA proxy agent may receive the RADIUS message even if the AAA proxy agent may not have an own address. Thus, the AAA proxy agent may use the address of the FA 200 and/or DHCP proxy/relay 201 as a "care of address".

Thus, collocating may also mean establish a connection or an association.

The WiMAX™ signalling message exchanged between the AAA proxy 205 and AAA proxy agent 204 may be an AR_RADIUS_Transfer message. The AR_RADIUS_Transfer message may be adapted such, that the message provides a predefined position or a predefined field, which is adapted to indicate that the content of the message shall be interpreted by a Master apparatus.

In an example, the AR_RADIUS_Transfer message may be defined as shown in table Tab. 1.

TABLE 1

| Function Type | Message Type | Contents of the message | |
|---|---|---|---|
| 8 | 3 | Field | M/O |
| | | RADIUS_Msg | M |

Table Tab. 1 shows an example of a structure for the AR_RADIUS_Transfer message. In the headline of table Tab. 1 the Funtion Type, message Type and Content of the message is indicated. The content of the message comprises the field it self and an indication whether the Field is mandatory (M) or optional (O).

Below the headline an example of a possible combination of values is indicated.

The values in the Function Type and Message Type fields together or the combination of the Function Type value and the Message Type value uniquely identify the message as the AR_RADIUS_Transfer message. This combination may allow the AAA proxy 205 and/or the AAA proxy agent 204 to identify the message as an AR_RADIUS_Transfer message.

In the example of table Tab. 1, the name of the message is AR_RADIUS_Transfer and Function Type is 8 and Message Type is 3, but other names and/or other numerical values are possible. In another example, the AR_RADIUS_Transfer message may comprise a Function Type value of 10 and a Message Type value of 3. The AR_RADIUS_Transfer message can be every message that allows indicating a message transfer between AAA proxy 205 and/or AAA proxy agent 204.

The RADIUS_Msg field in table Tab. 1 is a mandatory field and must be included in the AR_RADIUS_Transfer message. Its content is the RADIUS message as sent by the G-MS 106, for example in the uplink direction, i.e. towards the AAA proxy 205 or as received by the AAA proxy 205 from the AAA server 112a, 112b, for example in the downlink direction, including the IP header.

FA 200 may exist in CMIP4 (Client based Mobile IP Version 4) environments. Therefore, a CMIP4 G-MS 106, i.e. a G-MS usable in a CMIP4 environment, send RADIUS messages related to G-host 104 authentication to the address of the Foreign Agent 204.

A DHCP proxy/relay may exist in a non-CMIP4 environment. Thus, a non-CMIP4 G-MS send RADIUS messages related to G-host 104 authentication to the address of the DHCP proxy/relay function 201.

In an IP environment or in a PMIP4 (Proxy Mobile IP Version 4) mobility mode the AAA proxy function 205 is collocated with G-MS's authenticator 206 and the AAA proxy agent function is collocated with the DHCP proxy/relay 201.

In an IPv6 (Internet Protocol Version 6) environment, which may comprise all mobility modes, e.g. CMIP6, PMIP6 and simple IPv6, the AAA proxy agent is collocated with the AR (Access Router) function 203.

The AAA proxy function 111 may be split in a static AAA proxy function 205 and a mobile or a movable AAA proxy agent function 204. A mode can be a signalling procedure used to manage mobility of an MS at the IP layer. A Client Mobile IPv4 mode and a Proxy Mobile IP mode are differentiated. In the case of CMIP4 mobility mode the AAA proxy agent 204 can be collocated with the Foreign Agent 200. The split or the separation of AAA proxy function 205 in the ASN GW 114a and AAA proxy agent 204 hides mobility from the home AAA server 112, 112a, 112b. Thus, mobility for RADIUS may be supported. The basic RADIUS protocol may not provide support for mobility.

Home AAA server 112, 112a, 112b may be adapted to communicate with the (static) AAA proxy 111, 205, and AAA proxy 111, 205 is not relocated when the G-MS moves. When the G-MS 106 moves, mobility for the RADIUS protocol may be supported, by the AAA proxy agent 204, which moves together with an Access apparatus, such as the FA 200, the DHCP proxy/relay 201 and/or the AR 203. The AAA proxy agent knows how to reach the AAA proxy 205 and thus, a rigid connection between AAA server 112 and AAA proxy 111 is made flexible.

The separation of the AAA proxy function also allows to collocate the AAA proxy function 205 in the ASN 105 with the G-MS's authenticator function 206. If the authenticator 206 of the G-MS is relocated to a different ASN GW 114b, the AAA proxy function 205 for all G-hosts attached to the G-MS may also be moved to a new ASN GW together with the G-MS's authenticator.

This may allow scalability for large network deployments.

Furthermore, the point of attachment or the location of attachment of the G-MS 106 may be regarded when connecting to AAA proxy 111. A preconfigured AAA-proxy 111 could mean that the G-MS 106 may always send RADIUS messages to the preconfigured AAA proxy 111. Thus, a RADIUS request may be sent to the preconfigured AAA proxy 111, which may be far away from the current point of attachment, even if another nearer AAA proxy may be available. Allocating the AAA proxy 205 and AAA proxy agent 204 dynamically and moving the AAA proxy agent with the FA 200 and/or DHCP Proxy/relay 201 may allow to locate the Access apparatus, e.g. FA 200 or DHCP Proxy/relay 201, close to the G-MS 106 point of attachment to the network. The G-MS 106 point of attachment may be the BS 110. Locating the Access apparatus 200, 201, 203 close to the point of attachment 110 may allow providing short communication paths to the G-MS 106.

A roaming G-MS 106, may need not to be provisioned with one address for each NAP to which it can attach. Thus, roaming scenarios may be supported with a reduced effort for configuration or re-configuration. A static provisioning or a static configuration may be prevented.

Additional NAPs can be installed after the G-MS 106 was provisioned, without amending any configuration or address in the G-MS 106. The G-MS 106 may find the corresponding AAA proxy 111 or AAA proxy agent 204 without having configured the corresponding address. In a preconfigured case, i.e. if the G-MS 106 may have preconfigured IP addresses of proxies, the addresses may would have to be amended on an amending the AAA proxy location.

Load sharing and balancing between ASN GWs 114 may be possible

Packets may not have to be inspected at ASN GW 114a, 114b as the RADIUS messages from G-MS 106 are sent to the IP address of the ASN GW 114b. The destination IP address in the IP header is the address of the ASN GW 114b. If the destination address in the RADIUS packet would be different from the address of the ASN GW 114b, that would mean that the ASN GW 114b had to inspect every packet coming from the G-MS and check if this is a RADIUS packet, and if the packet is a RADIUS packet, the ASN GW 114b had to take the packet out of the G-MS data packet stream and process it separately, i.e. relay it to the next AAA server 112a, 112b. Instead, if the address in the RADIUS packet is the address of the ASN GW 114b, the ASN GW may only need to identify, e.g. based on the type of the packet, that the packet has to be processed by the AAA server 112a, 112b of the CSN 101, 102, 103. When the ASN GW 114b has identified that the packet has to be processed by the AAA server 112a, 112b, the ASN GW 114b simply sends the packet as it is to the CSN 101, 102, 103 via the AAA proxy agent 204. Inspecting every packet at the ASN GW 114b to see whether the packet is a RADIUS packet or not, may incur a significant overhead in terms of performance. The AAA proxy agent 204 may be reached by the type of the packets, i.e. RADIUS packets.

Figure 3:
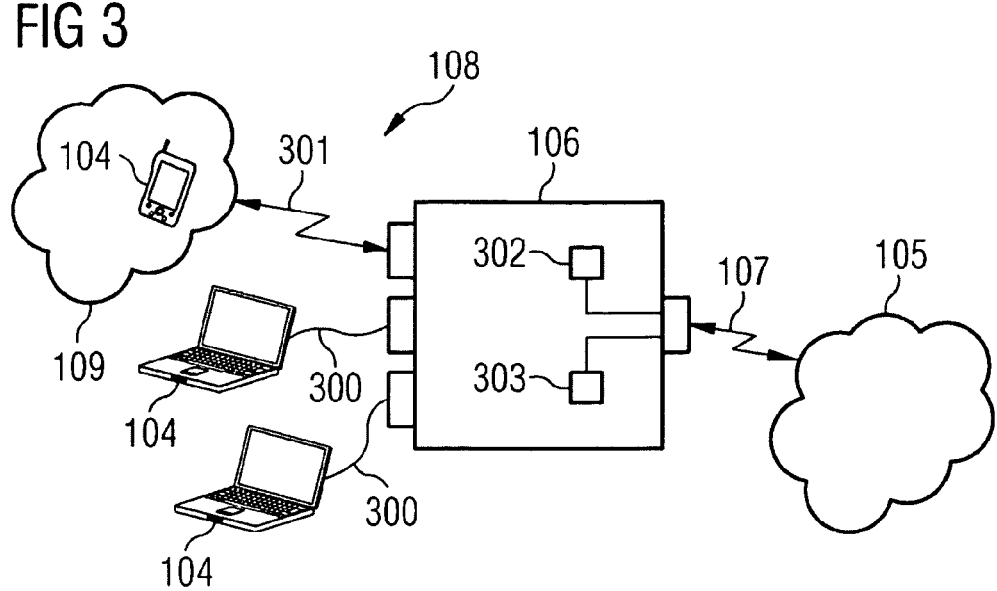
FIG. 3 shows a block diagram of a Mobile Gateway apparatus according to an exemplary embodiment of the present invention.

FIG. 3 shows a block diagram of a Mobile Gateway apparatus 106. The Mobile Gateway apparatus comprises a plurality of different interfaces 108. In particular FIG. 3 shows the wire bound interfaces 300, which may allow connecting computers. FIG. 3 also shows the wireless interface 301 of the Mobile Gateway apparatus which allows to provide a hotspot 109.

The wireless interface 301 may base on at least one of the IEEE 802.16, the IEEE 802.16e, the WiMAX™ standard and the wire bound interfaces 300 may base on the IEEE 802.3 standard. Other interface protocols like Bluetooth, GSM (Global System for Mobile Communication), UMTS (Universal Mobile Telecommunications System) or LTE (Long Term Evolution) are also possible.

The Mobile Gateway 106 provides access for the G-hosts 104 connected via the plurality of interfaces 108. The Mobile Gateway apparatus backhauls the collected traffic of the G-hosts 104 via network interface 107 to a NAP 105.

For authenticating the G-hosts 104, the Mobile Gateway apparatus 106 uses the RADIUS protocol. The RADIUS protocol may expect a RADIUS message to be sent to a RADIUS proxy.

However, since the Mobile Gateway apparatus 106 may be a mobile device, which roams in a network 105, the Mobile Gateway apparatus may not have an address of the RADIUS proxy. Thus, the address determining device 302 may determine an address of an Access apparatus (not shown in FIG. 3). The determined address can be used in the message sending device 303. In the message sending device 303 a message is indicated as a RADIUS message such that the message indicates the desire to be handled by a RADIUS function of a Master device or AAA server. Furthermore, the message sending device 303 is adapted to send the RADIUS message to the address of the determined Access apparatus.

Figure 4:
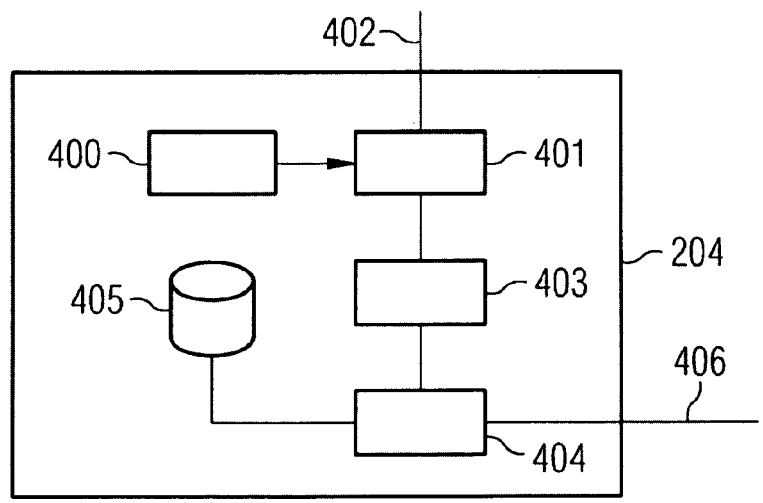
FIG. 4 shows a block diagram of a Proxy Agent apparatus according to an exemplary embodiment of the present invention.

In FIG. 4 a detailed block diagram of a Proxy Agent apparatus is shown. The collocating device 400 allows the Proxy Agent apparatus 204 to be coupled or attached to an Access apparatus. E.g. the collocating device 400 allows on movement of the Access Apparatus (not shown in FIG. 4) to determine an address of the Access apparatus.

The collocating device 400 allows to control the diverting device 401 such, that the diverting device manipulates the Access apparatus in order to send all messages which are of message type RADIUS, but have as destination address the corresponding address of the Access apparatus, via interface 402 to the Proxy Agent apparatus 204. The message determining device 403 may help determining such messages in the Proxy Agent apparatus.

After diverting the desired messages to the forwarding device 404, the forwarding device 404 accesses the storage device 405 to determine an address of a Master device or of a proxy function 205. The forwarding device 404 uses this address to forward the received message via the encapsulated interface 406 or via the tunnel 406 to the Master device (not shown in FIG. 4).

The encapsulated message sent via the encapsulated Proxy Agent interface 406 receives the Proxy Relay apparatus 205 via the Proxy Relay interface 500. The Proxy Agent apparatus 205 comprises a collocating device 502 and a relaying device 503. The collocating device 502 is adapted to collocate a Proxy Relay apparatus with an Authenticator apparatus (not shown in FIG. 5) for the Mobile Gateway apparatus (not shown in FIG. 5).

Figure 5:
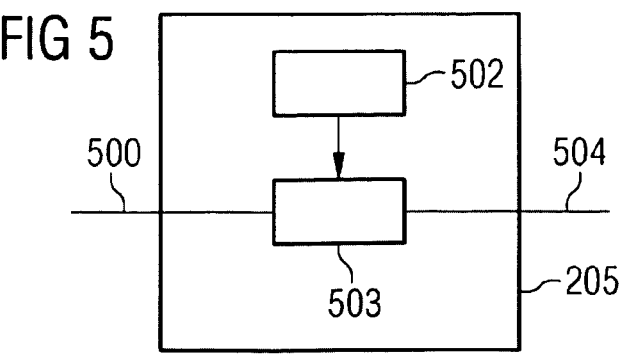
FIG. 5 shows a block diagram of a Proxy Relay apparatus according to an exemplary embodiment of the present invention.

The relaying device 503 is adapted for relaying a master function message, e.g. the RADIUS message, received from a Proxy Agent apparatus to the Master interface which is connected to the Master apparatus (not shown in FIG. 5).

Figure 6:
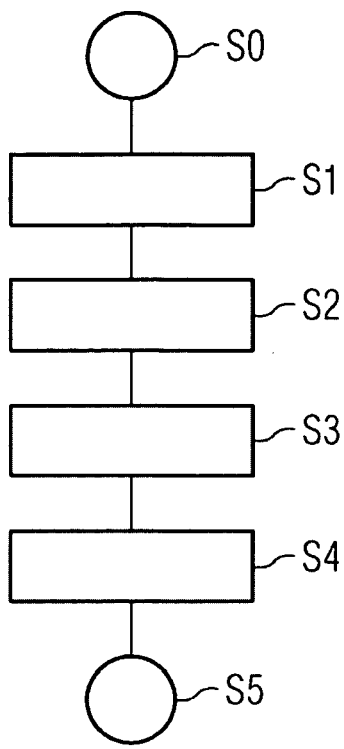
FIG. 6 shows a message flow diagram for a method for accessing a wireless communication network according to an exemplary embodiment of the present invention.

FIG. 6 shows a Flow chart for a method for accessing a wireless communication network.

In step S0 the method is in the idle mode.

In step S1, a Proxy Agent apparatus is collocated with an Access apparatus, wherein the Proxy Agent apparatus comprises information about a Master apparatus, the Master apparatus being adapted for executing a master function.

In step S2 the Mobile Gateway apparatus determines an address of the Access apparatus and indicates a message, to be handled by the master function, as a master function message.

In step S2 the Mobile Gateway apparatus sends the master function message to the address of an Access apparatus.

In step S3 the Proxy Agent apparatus diverts in the Access apparatus the master function message to the Proxy Agent apparatus. The Proxy Agent may manipulate a function within the Access apparatus in order to receive the desired messages.

In step S4 the master function message is forwarded to a Proxy Relay apparatus for relaying the master function message to the Master apparatus.

In Step S5 the method again reaches an idle status.

Figure 7:
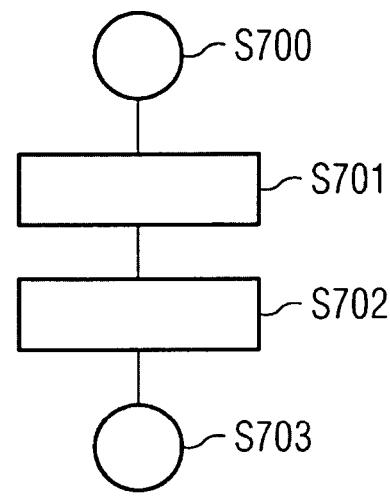
FIG. 7 shows a method flow diagram of a method for providing network access via a Mobile Gateway apparatus according to an exemplary embodiment of the present invention.

FIG. 7 shows a method for providing network access via a Mobile Gateway apparatus according to an exemplary embodiment of the present invention.

In step S700 the method is in an idle state.

In step S701 in the Mobile Gateway apparatus an address of an Access apparatus is determined.

In step S702 a message is indicated to be handled by a master function of a Master device as a master function message and the master function message is sent to the address of an Access apparatus.

In step S703 the method finishes by reaching the idle state S703.

Figure 8:
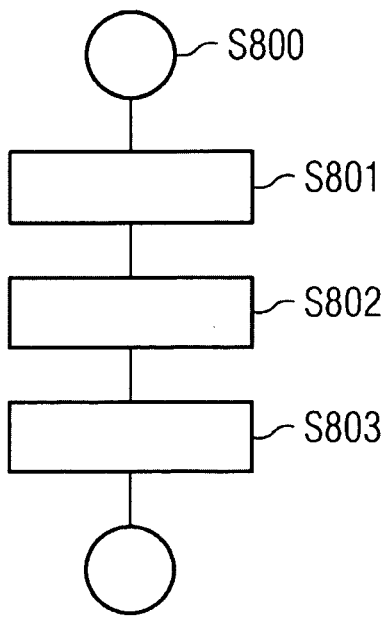
FIG. 8 shows a message flow diagram of a method for forwarding a master function message in a Proxy Agent apparatus.

A flow diagram for a method for forwarding a master function message in a Proxy Agent apparatus is depicted in FIG. 8.

Beginning in step S800, the method collocates in step S801 the Proxy Agent apparatus with an Access apparatus, wherein the Proxy Agent apparatus comprises information about a Master apparatus, the Master apparatus being adapted for conducting a master function.

In step S802 a master function message is detected which message is addressed to the Access apparatus and the message is diverted to the Proxy Agent apparatus.

Such a master function message in step S803 is forwarded to a Proxy Relay apparatus for relaying the master function message to the Master apparatus.

In step S804 the method is finished.

Figure 9:
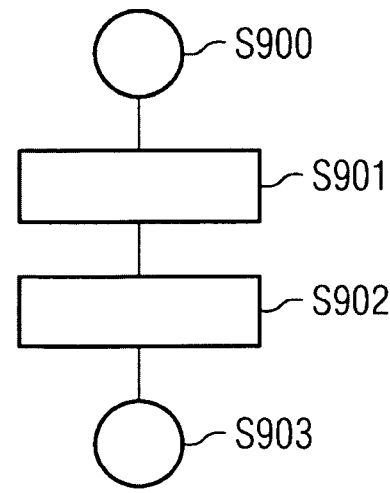
FIG. 9 shows a message flow diagram for a method for relaying a master function message to a Master apparatus.

FIG. 9 shows a method for relaying a master function message to a Master apparatus. The message starts in the idle mode S900.

In step S901 a Proxy Relay apparatus is collocated with an Authenticator apparatus, wherein the Authenticator is used for authentication of the Mobile Gateway apparatus.

In step S902 on receiving of a master function message from a Proxy Agent apparatus, the message is relayed to the Master apparatus and the method enters the idle mode S903.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

| Acronyms and Terminology | |
| --- | --- |
| AAA | Authentication, Authorization and Accounting |
| AR | Access Router |
| ASN | WiMAX ™ Access Serving Network |
| ASNGW | Access Serving Network Gateway |
| BAck | MIP6 Binding Acknowledge message |
| BS | WiMAX ™ Base Station |
| BU | MIP6 Binding Update message |
| CMIP | Client Mobile IP (as opposed to PMIP) |
| CoA | MIP6 Care-of Address |
| CSN | WiMAX ™ Connectivity Serving Network |
| DHCP | Dynamic Host Configuration Protocol |
| DHCP | Dynamic Host Configuration Protocol |
| EAP | Extensible Authentication Method |
| FA | Foreign Agent |
| FQDN | Fully Qualified Domain Name |
| G-host | end user device connected to the network via G-MS |
| G-MS | Gateway MS |
| HA | Home agent |
| H-AAA | Home AAA server (located in the home network of the WiMAX ™ subscriber) |
| host | IPv6 node |
| Host | same as G-host |
| IANA | Internet Assigned Numbers Authority |
| LMA | Local Mobility Anchor |
| MAG | Mobility Access Gateway |
| MIP | Mobile IP |
| MN | Mobile Node |
| MS | Wi MAX Mobile Station |
| NAI | Network Access Identifier |
| NAP | WiMAX ™ Access Network Provider (operator of an ASN) |
| netlmm | Network localized mobility management |
| NSP | WiMAX ™ Network Service Provider (operator of a CSN) |
| PBAck | PMIP6 Proxy Binding Acknowledge message |
| PBU | PMIP6 Proxy Binding Update message |
| PMIP | Proxy Mobile IP |
| PMIP | Proxy Mobile IP |
| PMIP4 | Proxy Mobile IP version 4 |
| PMIP6 | Proxy Mobile IPv6 |
| RAN | Radio Access Network |
| SA | Security Association |
| V-AM | visited AM server (located in the visited network) |
| VSA | Vendor Specific Attribute |

The invention claimed is:

1. A method for accessing a wireless communication network, comprising:
    collocating a Proxy Agent apparatus with an Access apparatus by the Proxy Agent apparatus sharing an address with the Access apparatus;
    wherein the Proxy Agent apparatus comprises information about a Master apparatus, the Master apparatus being adapted for executing a master function;
    dynamically determining in a Mobile Gateway apparatus an address of the Access apparatus, the Mobile Gateway apparatus being configured to link a plurality of subscriber stations to the Master apparatus;
    indicating a message, to be handled by the master function, as a master function message;
    sending the master function message to the address of the Access apparatus;
    diverting in the Access apparatus the master function message to the Proxy Agent apparatus; and
    forwarding the master function message to a Proxy Relay apparatus for relaying the master function message to the Master apparatus.

2. The method of claim 1, wherein the master function message is a RADIUS message.

3. The method of claim 1, wherein collocating comprises moving the Proxy Agent apparatus with the Access apparatus.

4. The method of claim 1, wherein the master function is an authentication and/or an authorization function.

5. The method of claim 1, wherein the Mobile Gateway apparatus is a G-MS.

6. The method of claim 1, wherein the Access apparatus is at least one apparatus selected of the group consisting of a DHCP Proxy, a DHCP Relay, a Foreign Agent and an Access Serving Network Gateway.

7. The method of claim 1, further comprising:
detecting in the Mobile Gateway apparatus an amendment of the Access apparatus.

8. The method of claim 1, wherein forwarding the master function message comprises encapsulating the master function message.

9. The method of claim 1, wherein forwarding the master function message comprises using an address of an Authenticator address.

10. The method of claim 1, wherein the Mobile Gateway is further configured to:
communicate with the Access apparatus via an IEEE 802.16 WiMAX connection; and
communicate with the subscriber stations via at least one of an IEEE 802.11 standard or an IEEE 802.3 standard.

11. The method of claim 1, wherein the dynamically determining includes dynamically determining, in the Mobile Gateway apparatus, the address of the Access apparatus using a Remote Authentication Dial In User Service (RADIUS) protocol.

12. A method for forwarding a master function message in a Proxy Agent apparatus, the method comprising:
collocating the Proxy Agent apparatus with an Access apparatus by the Proxy Agent apparatus sharing an address with the Access apparatus;
dynamically determining an address of the Access apparatus by a Mobile Gateway apparatus configured to link a plurality of subscriber stations to a Master apparatus;
wherein the Proxy Agent apparatus comprises information about a Master apparatus, the Master apparatus being adapted for conducting a master function;
detecting a master function message addressed to the Access apparatus;
diverting the master function message to the Proxy Agent apparatus; and
forwarding the master function message to a Proxy Relay apparatus for relaying the master function message to the Master apparatus.

13. A method for relaying a master function message to a Master apparatus, comprising:
collocating a Proxy Relay apparatus with an Authenticator apparatus, used for Mobile Gateway apparatus authentication, by the Proxy Relay apparatus sharing an address with the Authenticator apparatus;
dynamically determining an address of the Proxy Relay apparatus by a Mobile Gateway apparatus configured to link a plurality of subscriber stations to the Master apparatus; and
relaying a master function message received from a Proxy Agent apparatus to the Master apparatus.

14. The method of claim 13, further comprising:
receiving a message from the Master apparatus for the Proxy Agent apparatus; and
sending the message for the Proxy Agent apparatus to an address of an anchor data path function;
wherein the anchor data path function is collocated with the Proxy Agent apparatus.

15. A non-transitory computer-readable medium comprising program code, which program code, when being executed by a processor carries out:
collocating a Proxy Agent apparatus with an Access apparatus by the Proxy Agent sharing an address with the Access apparatus;
wherein the Proxy Agent apparatus comprises information about a Master apparatus, the Master apparatus being adapted for executing a master function;
dynamically determining in a Mobile Gateway apparatus an address of the Access apparatus, the Mobile Gateway apparatus being configured to link a plurality of subscriber stations to a Master apparatus;
indicating a message, to be handled by the master function, as a master function message;
sending the master function message to the address of the Access apparatus;
diverting in the Access apparatus the master function message to the Proxy Agent apparatus; and
forwarding the master function message to a Proxy Relay apparatus for relaying the master function message to the Master apparatus.

16. A communication system comprising:
a Proxy Agent apparatus;
an Access apparatus;
a Master apparatus;
a Mobile Gateway apparatus; and
a Proxy Relay apparatus;
wherein the Proxy Agent apparatus is adapted to be collocated with the Access apparatus by the Proxy Agent sharing an address with the Access apparatus;
wherein the Proxy Agent apparatus comprises information about the Master apparatus;
wherein the Master apparatus is adapted for executing a master function;
wherein the Mobile Gateway apparatus is adapted to dynamically determine an address of the Access apparatus and to link a plurality of subscriber stations to the Master apparatus;
wherein the Mobile Gateway apparatus is adapted to indicate a message, to be handled by the master function, as a master function message and to send the master function message to the address of the Access apparatus;
wherein the Access apparatus is adapted to divert the master function message to the Proxy Agent apparatus;
wherein the Proxy Agent apparatus is adapted to forward the master function message to a Proxy Relay apparatus for relaying the master function message to the Master apparatus.

17. A Proxy Agent apparatus comprising:
a collocating device;
a storage device;
a message detecting device;
a diverting device; and
a forwarding device;
wherein the collocating device is adapted to collocate the Proxy Agent apparatus with an Access device by the Proxy Agent sharing an address with the Access device and dynamically determine an address of the Access device and to link a plurality of subscriber stations to a Master apparatus;
wherein the storage device is adapted to store information about a Master apparatus, the Master apparatus being adapted for conducting a master function;

wherein the message detecting device is adapted to detect a master function message addressed to the Access device;

wherein the diverting device is adapted to divert the master function message addressed to the Access device to the Proxy Agent apparatus;

wherein the forwarding device is adapted to forward the master function message to a Proxy Relay apparatus for relaying the master function message to the Master apparatus using the stored information about the Master apparatus.

18. A Proxy Relay apparatus comprising:

a collocating device; and a relaying device;

wherein the collocating device is adapted to collocate a Proxy Relay apparatus with an Authenticator apparatus for a Mobile Gateway apparatus by the Proxy Relay apparatus sharing an address with the Authenticator apparatus and dynamically determine an address of the Proxy Relay apparatus;

wherein the relaying device is adapted for relaying a master function message received from a Proxy Agent apparatus to a Master apparatus.

* * * * *